(12) United States Patent
Williams et al.

(10) Patent No.: US 6,853,373 B2
(45) Date of Patent: Feb. 8, 2005

(54) METHODS, APPARATUS AND COMPUTER PROGRAM PRODUCTS FOR MODELING THREE-DIMENSIONAL COLORED OBJECTS

(75) Inventors: Steven P. Williams, Raleigh, NC (US); Herbert Edelsbrunner, Chapel Hill, NC (US); Ping Fu, Chapel Hill, NC (US)

(73) Assignee: Raindrop Geomagic, Inc., Durham, NC (US)

( * ) Notice: Subject to any disclaimer, the term of this patent is extended or adjusted under 35 U.S.C. 154(b) by 639 days.

(21) Appl. No.: 09/842,304

(22) Filed: Apr. 25, 2001

(65) Prior Publication Data

US 2002/0158880 A1 Oct. 31, 2002

(51) Int. Cl.$^7$ .............................................. G06T 15/00
(52) U.S. Cl. ..................................................... 345/419
(58) Field of Search ................................ 345/419, 420, 345/423, 427, 619

(56) References Cited

U.S. PATENT DOCUMENTS

| | | | |
|---|---|---|---|
| 4,719,585 A | 1/1988 | Cline et al. | 364/518 |
| 5,214,752 A | 5/1993 | Meshkat et al. | 395/123 |
| 5,440,674 A | 8/1995 | Park | 395/123 |
| 5,488,684 A | 1/1996 | Gharachorloo et al. | 395/123 |
| 5,506,947 A | 4/1996 | Taubin | 395/133 |
| 5,550,960 A | 8/1996 | Shirman et al. | 395/130 |
| 5,566,281 A | 10/1996 | Tokumasu et al. | 395/120 |
| 5,600,060 A | 2/1997 | Grant | 73/147 |
| 5,611,028 A | 3/1997 | Shibasaki et al. | 395/131 |
| 5,617,322 A | 4/1997 | Yokota | 364/468.04 |
| 5,701,404 A | 12/1997 | Stevens et al. | 395/123 |
| 5,719,599 A | 2/1998 | Yang | 345/430 |
| 5,726,896 A | 3/1998 | Jia et al. | 364/474.29 |
| 5,760,783 A | 6/1998 | Migdal et al. | 245/430 |
| 5,815,401 A | 9/1998 | Otsuki et al. | 364/474.31 |

(List continued on next page.)

OTHER PUBLICATIONS

Soucy et al., "A texture–mapping approach for the compression of colored 3D triangulations," The Visual Computer, vol. 12, 1996, pp. 503–514.

Krishnamurthy et al., "Fitting Smooth Surfaces to Densy Polygon Meshes," Computer Graphics Proceedings, Annual Conference Series, 1996, pp. 313–324.

(List continued on next page.)

*Primary Examiner*—Phu K. Nguyen
(74) *Attorney, Agent, or Firm*—Myers Bigel Sibley & Sajovec

(57) ABSTRACT

Methods, apparatus and computer program products can generate light weight but highly realistic and accurate colored models of three-dimensional colored objects. The colored model may be generated from a second plurality of points that define a coarse digital representation of the surface and at least one texture map containing information derived from a first plurality of colored points that define a fine digital representation of the surface. This derivation is achieved by mapping points within the texture map to the fine digital representation of the three-dimensional surface. Colored scan data may be used to construct the fine digital representation as a triangulated surface (i.e., triangulation) using a wrapping operation. This triangulated surface may be a two-manifold with or without nonzero boundary and the colored scan data may constitute raw point data with each datum comprising three real numbers (x-,y-, z-coordinates) providing geometric information and three integer numbers (r-,g-,b-values) providing color information. Operations are then performed to create the coarse digital representation from the fine digital representation and also preferably create a plurality a texture maps from the fine and coarse digital representations. One map may contain color information and another map may recover geometric detail lost in the simplification process associated with generating the coarse digital representation from the fine digital representation. An additional map may also be generated that corrects for differences in directions of normal vectors associated with the coarse and fine digital representations.

37 Claims, 7 Drawing Sheets

U.S. PATENT DOCUMENTS

| | | | | |
|---|---|---|---|---|
| 5,838,329 | A | | 11/1998 | Day .......................... 345/426 |
| 5,850,229 | A | | 12/1998 | Edelsbrunner et al. ...... 345/473 |
| 5,870,220 | A | | 2/1999 | Migdal et al. ............... 359/216 |
| 5,877,779 | A | | 3/1999 | Goldberg et al. ........... 345/511 |
| 5,880,736 | A | | 3/1999 | Peercy et al. ............... 345/426 |
| 5,883,631 | A | | 3/1999 | Konno et al. ............... 345/423 |
| 5,886,702 | A | | 3/1999 | Migdal et al. ............... 345/423 |
| 5,945,996 | A | | 8/1999 | Migdal et al. ............... 345/420 |
| 5,949,424 | A | | 9/1999 | Carbral et al. ............... 345/426 |
| 5,982,378 | A | | 11/1999 | Kato .......................... 345/430 |
| 5,988,862 | A | * | 11/1999 | Kacyra et al. ................. 703/6 |
| 5,991,437 | A | | 11/1999 | Migdal et al. ............... 382/154 |
| 5,995,110 | A | | 11/1999 | Litwinowicz ............... 345/425 |
| 5,995,650 | A | | 11/1999 | Migdal et al. ............... 382/154 |
| 6,005,584 | A | | 12/1999 | Kitamura et al. ........... 345/430 |
| 6,044,170 | A | | 3/2000 | Migdal et al. ............... 382/154 |
| 6,064,771 | A | | 5/2000 | Migdal et al. ............... 382/232 |
| 6,064,775 | A | | 5/2000 | Suzuki et al. ............... 382/254 |
| 6,072,496 | A | | 6/2000 | Guenter et al. ............. 345/419 |
| 6,078,332 | A | | 6/2000 | Ohazama .................... 345/426 |
| 6,100,893 | A | | 8/2000 | Ensz et al. .................. 345/420 |
| 6,108,006 | A | | 8/2000 | Hoppe ........................ 345/423 |
| 6,133,921 | A | | 10/2000 | Turkiyyah et al. .......... 345/420 |
| 6,163,320 | A | | 12/2000 | Barcena et al. ............. 345/430 |
| 6,169,553 | B1 | | 1/2001 | Fuller et al. ................. 345/427 |
| 6,176,427 | B1 | | 1/2001 | Antognini et al. .......... 235/454 |
| 6,184,893 | B1 | | 2/2001 | Devic et al. ................. 345/430 |
| 6,198,979 | B1 | | 3/2001 | Konno ......................... 700/98 |
| 6,201,546 | B1 | * | 3/2001 | Bodor et al. ................ 345/620 |
| 6,205,243 | B1 | | 3/2001 | Migdal et al. ............... 382/154 |
| 6,208,347 | B1 | | 3/2001 | Migdal et al. ............... 345/419 |
| 6,256,038 | B1 | * | 7/2001 | Krishnamurthy ........... 345/419 |
| 6,256,039 | B1 | | 7/2001 | Krishnamurthy ........... 345/420 |
| 6,271,856 | B1 | | 8/2001 | Krishnamurthy ........... 345/429 |
| 6,278,460 | B1 | | 8/2001 | Myers et al. ................ 345/424 |
| 6,285,372 | B1 | | 9/2001 | Cowsar et al. .............. 345/425 |
| 6,377,865 | B1 | | 4/2002 | Edelsbrunner et al. ........ 700/98 |
| 6,417,860 | B1 | * | 7/2002 | Migdal et al. ............... 345/582 |
| 6,654,690 | B2 | * | 11/2003 | Rahmes et al. ................ 702/5 |

OTHER PUBLICATIONS

Cohen et al, "Appearance–Preserving Simplification," University of North Carolina at Chapel Hill, No date, 8 pages.

Maruya, M., "Generating a Texture Map from Object–Surface Texture Data," EUROGRAPHICS '95, vol. 14, No. 3, 1995, pp. C–397 to C–405.

Piponi et al., "Seamless Texture Mapping of Subdivision Surfaces by Model Pelting and Texture Blending," MVFX, a division of Manex Entertainment, No date, pp. 471–478.

Bajaj et al. "Automatic Reconstruction of Surfaces and Scalar Fields from 3D Scans," Computer Graphics Proceedings, Annual Conference Series, 1995, pp. 109–118.

Bajaj et al., "Modeling with Cubic A–Patches," ACM Transactions on Graphics, vol. 14, No. 2, Apr. 1995, pp. 103–133.

Bajaj et al., "The Contour Spectrum," IEEE, 1997, pp. 167–173.

Barequet, Gill, "Piecewise–Linear Interpolation between Polygonal Slices," Computer Vision and Image Understanding, vol. 63, No. 2, Mar. 1996, pp. 251–272.

Boissonnat, Jean–Daniel, "Geometric Structures for Three–Dimensional Shape Representation," ACM Transactions on Graphics, vol. 3, No. 1, Oct. 1984, pp. 267–286.

Boissonnat, Jean–Daniel, "Shape Reconstruction from Planar Cross Sections," Computer Vision, Graphics, and Image Processing, vol. 44, 1988, pp. 1–29.

Bowyer, A. "Computing Dirichlet tessellations", The Computer Journal, vol. 24, No. 2, 1981, pp. 162–166.

Curless et al., "A Volumetric Method for Building Complex Models from Range Images," Computer Graphics Proceedings, Annual Conference Series, 1996, pp. 303–312.

Eck et al., "Automatic Reconstruction of B–Spline Surfaces of Arbitrary Topological Type," Computer Graphics Proceedings, Annual Conference Series, 1996, pp. 325–334.

Elber et al., "Filleting and Rounding using Trimmed Tensor Product Surfaces," ACM, 1997, pp. 206–216.

Elber et al., "Tool Path Generation for Freeform Surface Models," ACM, 1993, pp. 419–428.

Elber et al., "Adaptive Isocurve–Based Rendering for Freedom Surfaces," ACM Transactions on Graphics, vol. 15, No. 3, Jul. 1996, pp. 249–263.

Edelsbrunner et al., "Incremental Topological Flipping Works for Regular Triangulations," Algorithmica, vol. 15, 1996, pp. 223–241.

Edelsbrunner et al., "Three–Dimensional Alpha Shapes," ACM Transactions on Graphics, vol. 13, No. 1, Jan. 1994, pp. 43–72.

Fuchs et al., "Optimal Surface Reconstruction from Planar Contours," SIGGRAPH 77: The Fourth Annual Conference on Computer Graphics and Interactive Techniques, San Jose, California, Jul. 20–22, 1977, pp. 693–702.

Forsey et al., "Surface Fitting with Hierarchical Splines," ACM Transactions on Graphics, vol. 14, No. 2, Apr. 1995, pp. 134–161.

Hoppe et al., "Mesh Optimization," Computer Graphics Proceedings, Annual Conference Series, 1993, pp. 19–26.

Hoppe et al., "Piecewise Smooth Surface Reconstruction," Computer Graphics Proceedings, Annual Conference Series, 1994, pp. 295–302.

Hoppe et al., "Surface Reconstruction from Unorganized Points," Computer Graphics, vol. 26, No. 2, Jul. 1992, pp. 71–78.

Joe, Barry, "Construction of three–dimensional Delaunay triangulations using local transformations," Computer Aided Geometric Design, vol. 8, 1991, pp. 123–142.

Loop, Charles, "Smooth Spline Surfaces over Irregular Meshes," Computer Graphics Proceedings, Annual Conference Series, 1994, pp. 303–310.

Meyers, David et al., "Surfaces from Contours," ACM Transactions on Graphics, vol. 11, No. 3, Jul. 1992, pp. 229–258.

Peters, Jorg, "C–Surface Splines," Siam J. Numer. Anal., vol. 32, No. 2, Apr. 1995, pp. 645–666.

Staadt et al., "Multiresolution Compression and Reconstruction," IEEE, 1997, 2 pages.

Veltkamp, Remco, "Closed Object Boundaries from Scattered Points," CWI, Department of Interactive Systems, Amsterdam, The Netherlands, Aug. 1992, 149 pages.

Edelsbrunner et al., "Simulation of Simplicity: A Technique to Cope with Degenerate Cases in Geometric Algorithms," ACM Transactions on Graphics, vol. 9, No. 1, Jan. 1990, pp. 66–104.

Edelsbrunner, H., "An Acyclicity Theorem for Cell Complexes in d Dimension," Combinatorica, vol. 10, No. 3, 1990, pp. 251–260.

Krishnamurthy, et al., "Fitting Smooth Surfaces to Dense Polygon Meshes," SIGGRAPH 96, New Orleans, Louisiana, Aug. 4–9, 1996, pp. 313–324.

Lodha et al., "Scattered Data Techniques for Surfaces," Proceedings of a Dagstuhl Seminar, Scientific Visualization Dagstuhl '97, Hagen, Nielson and Post (eds.) pp. 189–230.

* cited by examiner

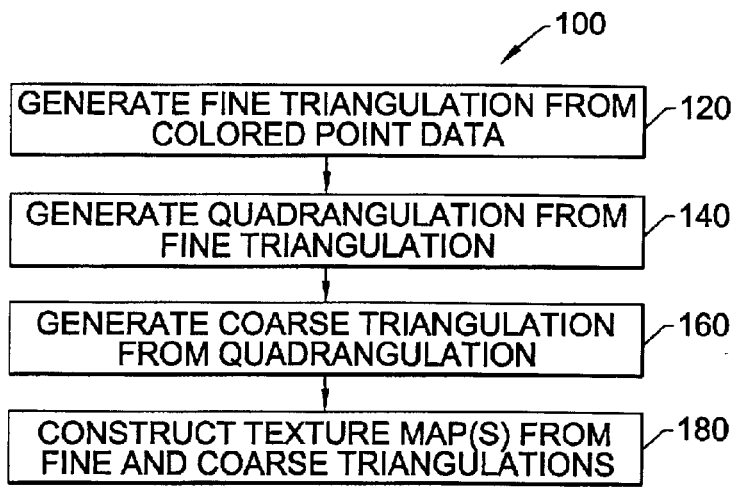
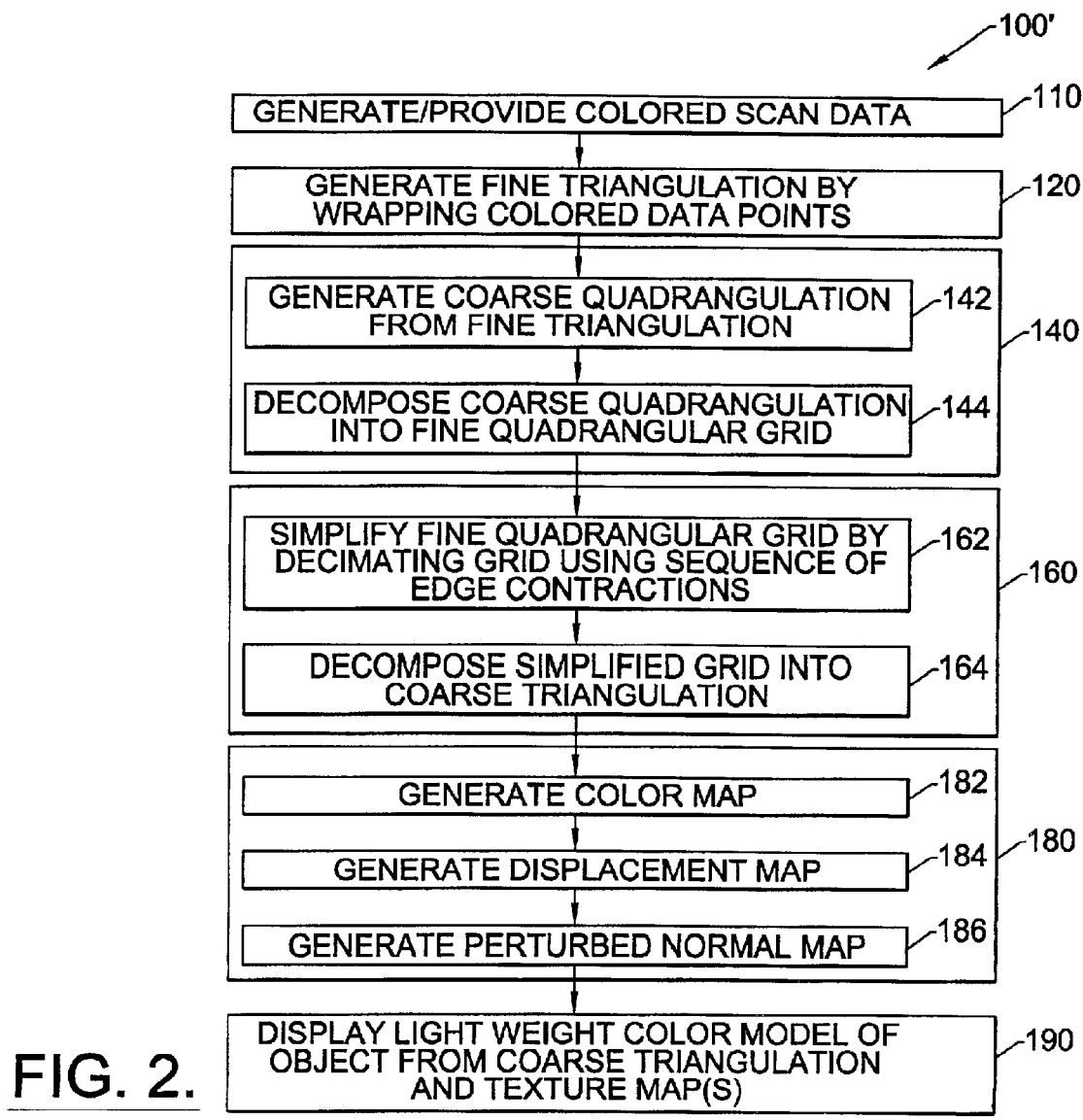

CLOSED WHISKER    OPEN WHISKER

METHODS, APPARATUS AND COMPUTER PROGRAM PRODUCTS FOR MODELING THREE-DIMENSIONAL COLORED OBJECTS

FIELD OF THE INVENTION

This invention relates to methods, apparatus and computer program products that model three-dimensional objects and, more particularly, to methods, apparatus and computer program products that model three-dimensional objects using texture maps.

BACKGROUND OF THE INVENTION

Standard approaches to the digital representation and graphical rendering of geometric shape represent macro-scale information geometrically and micro-scale information through texture maps. These maps are arrays with hardware supported indexing and retrieval mechanisms. Texture maps that have frequently been used to add artificial detail to simple geometric models in order to make them appear more realistic include repetitive color and displacement patterns. Texture maps have also been used to encode other types of information including normal offset information. Texture maps that store normal offset information are called bump maps.

One standard approach to rendering geometric shape is disclosed in U.S. Pat. No. 6,184,893 to Devic et al. entitled "Method and System for Filtering Texture Map Data for Improved Image Quality in a Graphics Computer System". In particular, the '893 patent discloses a method and system for filtering texture map data. This filtering operation is performed to reduce flickering and sparkling when rendering a relatively small graphics primitive using a texel map of relatively larger area. Another approach to rendering geometric shape, which is described in U.S. Pat. No. 5,949,424 to Cabral et al., entitled "Method, System and Computer Program Product for Bump Mapping in Tangent Space", uses a tangent space transform module. This module is used to build a tangent space transform matrix having elements comprised of normal, tangent and binormal vector components determined at a surface point on an object surface. A texture memory also stores a surface dependent or surface independent tangent space perturbed normal texture map. U.S. Pat. No. 5,719,599 to Yang, entitled "Method and Apparatus for Efficient Digital Modeling and Texture Mapping", discloses methods and apparatus for mapping texture from a first raster of pixels to a second raster of pixels that may be a displayable frame buffer or other target map.

An article by M. Soucy et al., entitled "A Texture-Mapping Approach for the Compression of Colored 3-D Triangulations", The Visual Computer, Springer-Verlag, Vol. 12, pp. 503–514 (1996), addresses the problem of compressing high-resolution colored 3D triangulations into relatively compact geometric descriptions that can be displayed in real time on graphics workstations. The Soucy et al. article proposes a two step approach for the generation of compact texture-mapped models from high-resolution colored models. First, an initial triangulation is decimated using a compression technique that maintains a mapping between the vertices of the initial triangulation and a compressed 3D triangulation. Once the initial triangulation has been compressed, all vertices removed from the initial triangulation are attributed the barycentric coordinates (u, v, w) of their projection onto the larger triangles in the compressed triangulation. Accordingly, each triangle in the compressed triangulation has a color triplet at each vertex, as well as a variable number of removed vertices mapped onto its planar surface. The color information that was mapped onto the compressed triangulation is then used to generate a texture map. The texture map is tessellated so that each triangle in the compressed triangulation has its own texture domain within the texture map. Adjacent triangles on the compressed triangulation are not necessarily mapped to contiguous texture domains within the texture map in order to improve the representations of models of different topology. As a result, adjacent 3D triangles in the compressed triangulation are not necessarily adjacent once they are projected onto the texture map.

The operations described in the Soucy et al. article are limited by the fact that the texture map includes a separate texture domain for each of the large number of triangles within the compressed triangulation. This results in a large texture map and reduces rendering efficiency and speed. Morever, because the texture map is created by mapping the vertices of the initial triangulation to the surfaces of the compressed triangulation, the images of the texture map can become distorted because of the typically poor correspondence between the initial and compressed triangulations.

An article by V. Krishnamurthy et al., entitled "Fitting Smooth Surfaces to Dense Polygon Meshes", Computer Graphics, Proceedings, pp. 313–324 (1996), discloses operations for converting dense irregular polygonal meshes (e.g., dense triangular mesh) of arbitrary topology into tensor B-spline surface patches with accompanying displacement maps. The first step in the operations consists of interactively painting patch boundaries over a rendering of the polygonal mesh. This interactive placement of patch boundaries is described as being part of the creative process and not amenable to automation. The next step involves gridded resampling of each bounded section of the triangular mesh. The resampling operation lays a grid of springs across the triangular mesh and then iterates between relaxing the grid the subdividing it. This spring grid provides a parameterization for the mesh section, which is initially unparameterized. A tensor product B-spline surface is then fit to the spring grid. A displacement map is also determined for each mesh section. This displacement map represents the error between the tensor product B-spline surface and the spring grid.

The operations described in the Krishnamurthy et al. article are limited by the requirement of interactive painting of patch boundaries over a triangular mesh. Interactive painting involves a manual and time consuming sequence of operations to define a coarse model having quadrangular domains. Moreover, the displacement map typically provides only limited improvement in rendering because it is only computed from the difference between the final surface (B-spline surface) and the spring grid, and not between the final surface and the original triangular mesh.

Thus, notwithstanding these conventional techniques, there is a need for highly automated systems that improve shape rendering by incorporating real geometric and color detail derived directly from physical objects into enhanced texture maps. There is also a need for systems that can automatically generate light weight but highly realistic and accurate models of three-dimensional colored objects from the enhanced texture maps.

SUMMARY OF THE INVENTION

Methods, apparatus and computer program products according to embodiments of the present invention can provide efficient techniques that can be used to capture actual color and shape detail from physical objects and can automatically convert this captured information into model-enhancing texture maps. These model-enhancing texture maps can then be used in conjunction with lower-complexity geometric models to generate light weight but highly realistic and accurate models of three-dimensional colored objects.

According to an embodiment of the invention, a colored model of a surface of a three-dimensional colored object may be generated from a second plurality of points that define a coarse digital representation of the surface and at least one texture map containing information derived from a first plurality of three-dimensional points that define a fine digital representation of the surface. This derivation is achieved by mapping points within the texture map to the fine digital representation of the three-dimensional surface. Colored scan data may be used to construct the fine digital representation as a triangulated surface (i.e., triangulation) using a wrapping operation. This triangulated surface may be a two-manifold with or without nonzero boundary and the colored scan data may constitute raw point data with each datum comprising three real numbers (x-,y-, z-coordinates) providing geometric information and three integer numbers (r-,g-,b-values) providing color information. Operations are then performed to create the coarse digital representation from the fine digital representation and also preferably create a plurality a texture maps from the fine and coarse digital representations. One map may contain color information and another map may recover geometric detail lost in the simplification process associated with generating the coarse digital representation from the fine digital representation. An additional map may also be generated that corrects for differences in directions of normal vectors associated with the coarse and fine digital representations.

Preferred operations to generate a colored model of the surface of the three-dimensional colored object may also include generating a quadrangulation of the surface from the first plurality of colored points and then converting the quadrangulation into the second plurality of points. In particular, each quadrangular patch Q in the quadrangulation may be parametrized by a homeomorphism that can be constructed by decomposing the patch into a fine quadrangular grid. The grid and parametrization may then be simplified, preferably using operations that decimate the quadrangular grid through a sequence of track contractions that are prioritized by an error function. An operation may also be performed to create a coarse triangulation by decomposing each face of the simplified grid into a respective pair of triangles, with the vertices of the resulting triangles representing the second plurality of points.

One property of the grid lines and quadrangular patch layout is that continuous lines that completely wrap the model are created. Because each patch edge is connected to one and only one other patch, and each patch edge is divided into the same number of segments, the grid lines seamlessly transfer in u,v space from patch to patch. If the model is a closed manifold, each grid line will be a continuous loop. Two parallel grid lines can be thought of as a grid "track". These tracks have the same continuous property as the grid lines do. The collection of tracks defines the shape of the model just as the collection of triangles does. Each track contributes a definable amount to the general shape of the model and therefore can be prioritized in shape contributing order (based on the error function). The tracks that contribute the least amount to the shape can be systematically removed to reduce grid complexity. After each track removal, the remaining tracks are reassessed as to their shape contribution and reprioritized. This process is continued until the desired amount of complexity is reached.

Alternatively, the operations to convert the quadrangulation into the second plurality of points may include decomposing the quadrangulation into a quadrangular grid and then generating an intermediate triangulation from the quadrangular grid. The intermediate triangulation may be generated by decomposing the quadrangular grid with a constraint that vertices of the quadrangular grid and patch boundaries from the quadrangulation be preserved. The intermediate triangulation may then be decimated using a sequence of edge contractions that preserve patch boundaries from the quadrangulation.

A texture map may also be determined for the coarse digital representation of the surface by determining, for a first texel in the texture map, a respective texel coordinate that identifies a first spatial point on the coarse digital representation of the surface. The first spatial point is then projected to a first object point on the fine digital representation of the surface. The texture map may constitute: (i) a color map by assigning a color associated with the first object point to the first texel, (ii) a displacement map by assigning a height difference between the first spatial point and the first object point to the first texel and/or (iii) a perturbed normal map by assigning a difference between a first normal at the first spatial point and a second normal at the first object point to the first texel.

If the first plurality of colored points constitute vertices of a fine triangulation and the second plurality of points constitute vertices of a coarse triangulation, then the color associated with the first object point y on the fine triangulation may be determined by a color function $\chi(y)$, where $\chi(y)=\alpha\chi(a)+\beta\chi(b)+\gamma\chi(c)$, abc is a triangle on the fine triangulation that contains the first object point y and $\alpha, \beta, \gamma$ are the barycentric coordinates of y defined such that $\alpha+\beta+\gamma=1$ and $\alpha a+\beta b+\gamma c=y$. Operations to determine the displacement map may be performed by assigning a height difference $\delta(y)$ between the first spatial point x and the first object point y to the first texel, where $y=x+\delta(y) \cdot n_x$ and $n_x$ is a unit vector that extends in a direction from the first spatial point x to the first object point y and is normal to the coarse digital representation at the first spatial point x. Operations to determine the perturbed normal map may include constructing an orthonormal frame (N, T, B) defined for $N=n_x$, where T and B are the tangent and binormal directions at the first spatial point x, respectively. A triplet $(\lambda,\mu,u)\epsilon[-1, +1]^3$ may also be determined, where $n_y=\lambda \cdot N+\mu \cdot T+u \cdot B$ and $n_y$ is a unit normal vector at the first object point y as expressed in the orthonormal frame. In the event the patch boundaries of the quadrangulation trace u-coordinate and v-coordinate lines, then $T=N \times d$ and $B=T \times N$, where d is a direction of a v-coordinate line passing through the first spatial point on the coarse triangulation.

Additional embodiments of the invention may include operations to generate a NURBS model from the first plurality of colored points and then convert the NURBS model into the second plurality of points. Operations to determine a texture map may also include operations to construct a texture map for the coarse digital representation using a parametrization $\psi$ of quadrangular patches Q on the quadrangulation. These operations to construct a texture map may also include determining for a first texel in the texture map a respective texel coordinate that, using $\psi^{-1}$, identifies a first spatial point x on the coarse digital representation of the surface.

BRIEF DESCRIPTION OF THE DRAWINGS

FIG. 1 is a flow diagram of operations performed by embodiments of the invention that can generate light weight but highly realistic and accurate models of three-dimensional colored objects.

FIG. 2 is a flow diagram of operations performed by additional embodiments of the invention.

DESCRIPTION OF A PREFERRED EMBODIMENT

Figure 3:
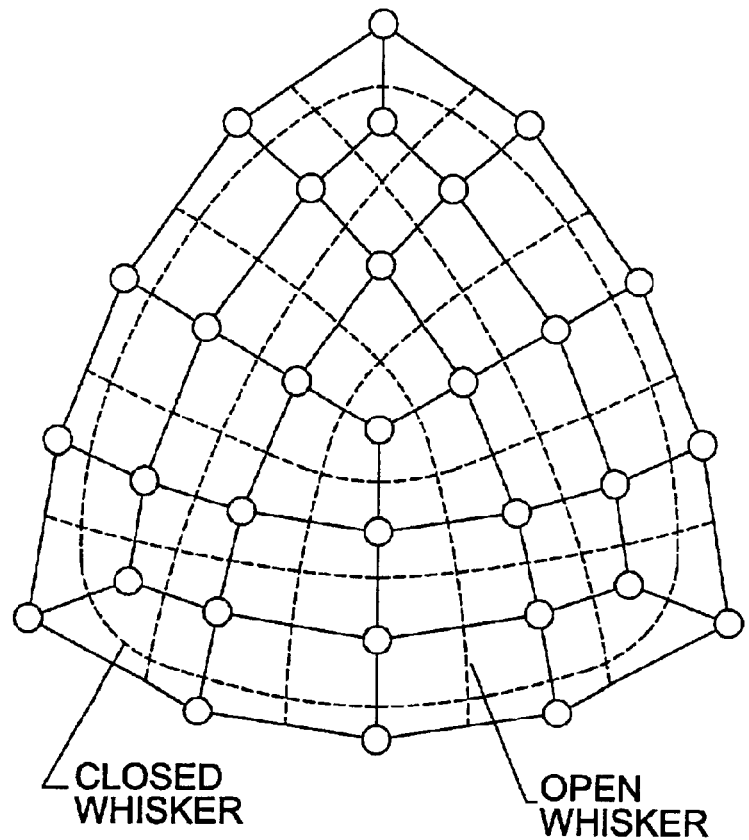
FIG. 3 illustrates a surface piece of a fine quadrangular grid decomposed into twenty four quadrangles.

The present invention now will be described more fully hereinafter with reference to the accompanying drawings, in which preferred embodiments of the invention are shown. This invention may, however, be embodied in many different forms and applied to other articles and should not be construed as limited to the embodiments set forth herein; rather, these embodiments are provided so that this disclosure will be thorough and complete, and will fully convey the scope of the invention to those skilled in the art. The operations of the present invention, as described more fully hereinbelow and in the accompanying figures, may be performed by an entirely hardware embodiment or, more preferably, an embodiment combining both software and hardware aspects and some degree of user input. Furthermore, aspects of the present invention may take the form of a computer program product on a computer-readable storage medium having computer-readable program code embodied in the medium. Any suitable computer-readable medium may be utilized including hard disks, CD-ROMs or other optical or magnetic storage devices. Like numbers refer to like elements throughout.

Various aspects of the present invention are illustrated in detail in the following figures, including flowchart illustrations. It will be understood that each of a plurality of blocks of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each of a plurality of blocks of the flowchart illustrations, and combinations of blocks in the flowchart illustrations, can be implemented by special purpose hardware-based computer systems which perform the specified functions or steps, or by combinations of special purpose hardware and computer instructions.

Referring now to FIG. 1, operations 100 performed by embodiments of the invention can generate light weight but highly realistic and accurate models of three-dimensional colored objects from model-enhancing texture maps and low complexity geometric models. As illustrated by Blocks 120 and 140, operations are preferably performed to generate a fine triangulation from colored point data and generate a quadrangulation from the fine triangulation. Operations may then be performed to generate a coarse triangulation from the quadrangulation and generate at least one texture map from the fine and coarse triangulations, Blocks 160 and 180. The coarse triangulation and at least one texture map can then be used to generate a highly-accurate color model of a corresponding three-dimensional colored object.

According to one embodiment of the invention, a colored model of a surface of a three-dimensional colored object may be generated from a second plurality of points that define a coarse digital representation of the surface and at least one texture map containing information derived from a first plurality of colored points that define a fine digital representation of the surface. This derivation is achieved by mapping points within the texture map to the fine digital representation of the three-dimensional surface. As illustrated by the operations 100' of FIG. 2 and Blocks 110 and 120 therein, colored scan data may be used to construct the fine digital representation as a fine triangulated surface (i.e., triangulation) having colored vertices. A wrapping operation is preferably used to construct the fine triangulated surface from the colored scan data. The triangulation may be a two-manifold with or without nonzero boundary and the colored scan data may constitute raw point cloud data with each datum comprising three real numbers (x-, y-, z-coordinates) providing geometric information and three integer numbers (r-, g-, b-values) providing color information. The fine triangulation may also be generated using conventional operations that do not include wrapping or a triangulation having colored vertices may be predefined.

The colored scan data may be generated using conventional techniques for scanning physical objects. Preferred initial operations to construct the fine digital representation as a fine triangulation are more fully described in commonly assigned U.S. application Ser. No. 09/248,587, filed Feb. 11, 1999, entitled "Method of Automatic Shape Reconstruction", the disclosure of which is hereby incorporated herein by reference. These initial operations may also include techniques to generate a Delaunay complex of colored point cloud data points. Techniques to generate Delaunay complexes are more fully described in U.S. Pat. No. 5,850,229 to Edelsbrunner et al., entitled "Apparatus and Method for Geometric Morphing", the disclosure of which is hereby incorporated herein by reference. The initial operations to construct the fine digital representation preferably use geometric techniques to infer the shape of the model from a set of colored data points that are stored in a point cloud data file. These operations may include building a Wrap™ model from the colored data point set using strict geometric rules that result in a triangulation that passes through points in the point set. Such operations are provided by commercially available software, Geomagic Studio™ 3.1, marketed by Raindrop Geomagic, Inc. of Research Triangle Park, N.C., assignee of the present application.

Referring still to FIG. 2, operations may then be performed to create the coarse digital representation from the fine digital representation and also preferably to create a plurality a texture maps from the fine and coarse digital representations, as illustrated by Blocks 140, 160 and 180. One map may contain color information and another map may recover geometric detail lost in the simplification process associated with generating the coarse digital representation from the fine digital representation, Blocks 182 and 184. An additional map may also be generated that corrects for differences in directions of normal vectors associated with the coarse and fine digital representations, Block 186.

As illustrated by Block 142, a coarse quadrangulation of the surface is preferably generated from the first plurality of colored points. Each quadrangular patch Q in the coarse quadrangulation is preferably parametrized by a homeomorphism $q:Q \to [0,1]^2$ that may be constructed by decomposing each patch Q into a fine quadrangular grid, Block 144. Examples of operations to generate the coarse quadrangulation from a triangulation and decompose the coarse quadrangulation into a fine quadrangular grid are more fully described in commonly assigned U.S. application Ser. No. 09/607,122, filed Jun. 29, 2000, entitled "Methods, Apparatus and Computer Program Products for Automatically Generating Nurbs Models of Triangulated Surfaces Using Homeomorphisms", the disclosure of which is hereby incorporated herein by reference. Such operations are provided by commercially available software that automatically shapes the wrapped colored data points, Geomagic Studio™ 3.1, marketed by Raindrop Geomagic, Inc. of Research Triangle Park, NC. Conventional operations may also be used to generate a parametrized coarser quadrangulation with patches Q.

The fine quadrangular grid and parametrization may then be simplified, Block 162. This simplification operation is preferably performed by decimating the fine quadrangular grid through a sequence of track contractions that are prioritized by an error function. The tracks that contribute the least amount to the shape can be systematically removed to reduce grid complexity. After each track removal, the remaining tracks are reassessed as to their shape contribution and reprioritized. Each face of the simplified grid may then be decomposed into a respective pair of triangles, with the vertices of the resulting coarse triangulated surface representing the second plurality of points, Block 164. Because each one of the two possible diagonals across each face of the simplified grid will result in a respective pair of distinct triangles, the decomposition operation will result in one of two possible pairs of triangles for each face. As described herein, each face of the simplified grid constitutes a quadrangular patch that may be treated as the union of one of the two pairs of triangles in its corresponding triangulation. Alternatively, the operations of Block 160 to generate a coarse triangulation from the quadrangulation may include decomposing the quadrangulation into a quadrangular grid and then generating an intermediate triangulation from the quadrangular grid without explicitly decimating the quadrangular grid using track contractions. The intermediate triangulation may be generated by decomposing the quadrangular grid with a constraint that vertices of the quadrangular grid and the boundaries of the patches Q from the quadrangulation be preserved. The intermediate triangulation may then be decimated into the coarse triangulation using a sequence of edge contractions that preserve patch boundaries from the quadrangulation. Conventional triangle-based simplification operations are described in an article by M. Garland and P. S. Heckbert, entitled "Surface Simplification Using Quadratic Error Metrics", Computer Graphics Proceedings, SIGGRAPH, pp. 209–216 (1997). These conventional operations may be used so long as they preserve the quadrangular patch structure. Patch structure can be preserved using the topology preserving constraints described in an article to T. K. Dey, H. Edelsbrunner, S. Guha and D. V. Nekhayev, entitled "Topology Preserving Edge Contraction", Publ. Inst. Math, (Beograd) (N.S.) Vol. 66, pp. 23–45 (1999), the disclosure of which is hereby incorporated herein by reference. Other parametrized representations of patches, such as NURBS and subdivision surfaces, may also be used by redefining the maps $\psi$ and $\phi$ described hereinbelow. A parametrized representation of one type of subdivision surface is described in an article by A. Lee, H. Moreton and H. Hoppe, entitled "Displaced Subdivision Surface," Computer Graphics Proceedings, SIGGRAPH, pp. 85–94, (2000).

Operations are also performed to construct at least one texture map from the fine and coarse triangulations, Block 180. These operations include determining, for a first texel in the texture map, a respective texel coordinate that identifies a first spatial point on the coarse triangulation. The first spatial point is then projected to a first object point on the fine triangulation. As illustrated by Block 182, a color map may be determined by assigning a color associated with the first object point to the first texel. In addition, a displacement map may be constructed by assigning a height difference between the first spatial point and the first object point to the first texel, Block 184. A perturbed normal map may be determined by assigning a difference between a first normal at the first spatial point and a second normal at the first object point to the first texel, Block 186. Conventional operations may then be performed to store, display, print and/or generate a color model of an object from the light weight coarse triangulation and texture map(s), Block 190.

Figure 11:
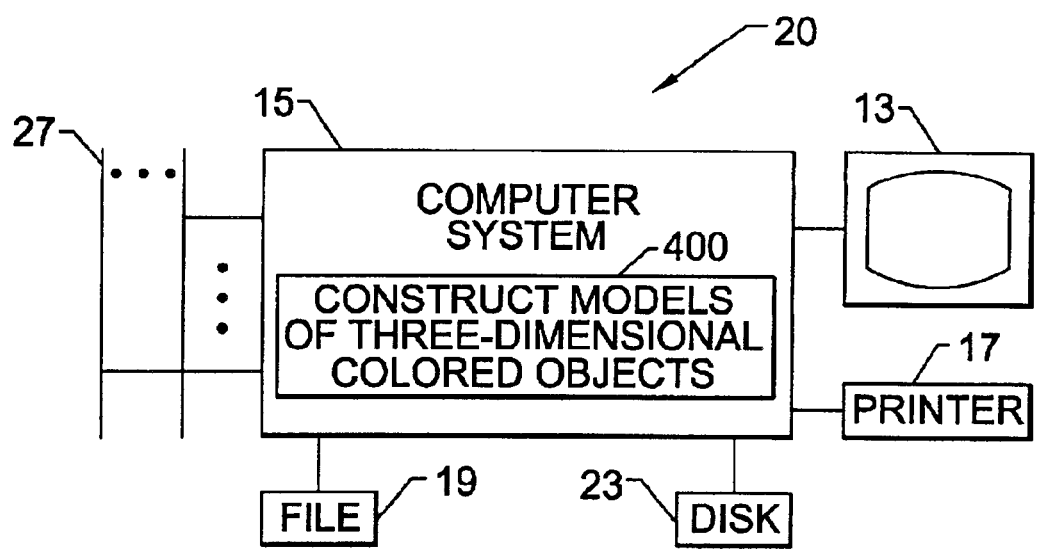
FIG. 11 is a general hardware description of a computer workstation comprising software and hardware for generating highly realistic and accurate models of three-dimensional colored objects according to embodiments of the present invention.

Referring now to FIG. 11, a general hardware description of a computer workstation is illustrated comprising, among other things, software and hardware for generating highly realistic and accurate models of three-dimensional colored objects according to embodiments of the invention. The workstation 20 preferably includes a computer 15 that may accept a point cloud data representation of a colored object via a file 19, disk input 23 or data bus 27. The computer 15 preferably comprises a computer-readable storage medium having computer-readable program code embodied in the medium. This computer-readable program code is readable by one or more processors within the computer 15 and tangibly embodies a program of instructions executable by the processor to perform the operations described herein and illustrated by the accompanying figures.

More detailed operations to simplify the fine quadrangular grid and parametrization, Block 162, will now be described.

These operations include simplifying the fine quadrangular grid to a coarser grid approximating the same surface. In order to efficiently construct texture maps, it is preferable to convert the coarser grid into a triangulation by decomposing each quadrangular face of the coarser grid into a respective pair of triangles. This grid decomposition operation can be performed to generate a coarse and sufficiently regular triangulation that can be decomposed into long triangle strips. These sufficiently regular triangulations are preferred because they can be rendered faster than other triangulations (e.g., irregular triangulations).

An important structural property of the fine quadrangular grid is that its dual graph can be decomposed into edge disjoint curves, which can be referred to as whiskers. If a first quadrangle of the fine quadrangular grid is entered through a first edge and exited through an opposite edge (thus entering an adjacent second quadrangle), then the traversal path through the first quadrangle and through a sequence of second and subsequent quadrangles traces a curve. If the traversal path defined by this curve reenters the first quadrangle through the first edge, then the curve represents a closed curve (closed whisker) which may or may not cross itself. However, if the traversal path defined by the curve exits the fine quadrangular grid at a boundary edge (without reentering the fine quadrangular grid), then the curve is extended backwards by reversing the traversal direction until another boundary edge is reached, thus completing an open curve (open whisker) with two ends. FIG. 3 illustrates a surface piece of a fine quadrangular grid decomposed into twenty four (24) quadrangles, as illustrated by the solid lines. This surface piece contains one closed whisker and six open whiskers defined by dotted lines. As illustrated by FIG. 3, each of the quadrangles is traversed exactly twice, either by two cross whiskers or by a single self-crossing whisker. The crossings are in one-to-one correspondence with the quadrangles, implying that there are equally many of both. A track is the dual of a whisker, namely a sequence of quadrangles traversed by a whisker. The sequence of quadrangles may be cyclic or may start at one quadrangle and end at another quadrangle. A lateral edge of the track is one that crosses the dual whisker. The fine quadrangular grid can be simplified by the successive removal of whiskers.

Figure 4:
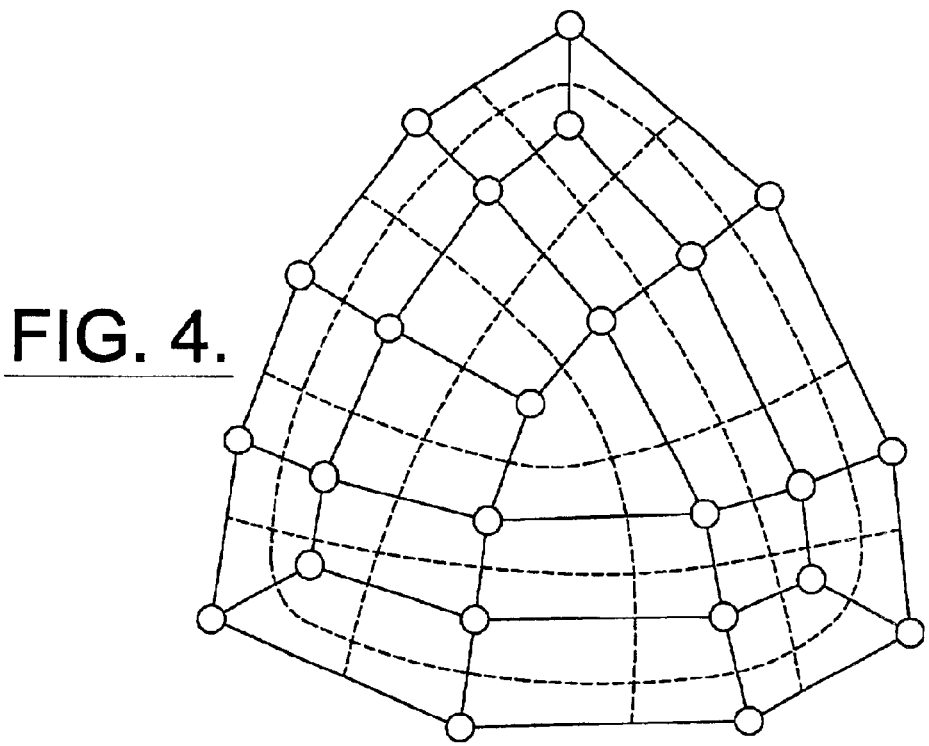
FIG. 4 illustrates the surface piece of FIG. 3, after an open whisker has been removed.

Operations to simplify the fine gridded representation of the parametrized coarse quadrangulation generated at Block 142 of FIG. 2, will now be described. As will be understood by those skilled in the art, the fine quadrangular grid is a finer quadrangulation than the parametrized coarse quadrangulation and is used to capture geometric detail. The simplification operations performed on the fine quadrangular grid are preferably driven by a priority queue that orders whiskers by the error their removal causes. Removing a whisker corresponds to contracting all quadrangles of the dual track. This operation is performed by moving the two track boundaries towards each other until they meet. In other words, all lateral edges of the track are contracted. FIG. 4 illustrates the surface piece of FIG. 3 after an open whisker has been removed. Because the removal of a whisker is equivalent to contracting the dual track, the neighboring tracks of FIG. 4 are widened. The simplification operations are preferably performed with a constraint that whisker removals not be considered in the priority queue if such removal changes the topology of the quadrangulated surface (i.e., the surfaces before and after a respective whisker has been removed are not homeomorphic to each other). Conventional operations for performing edge contractions that do not change topological type are more fully described in the aforementioned articled to T. K Dey et al. Operations for performing edge contractions to simplify surfaces consisting of triangles in $R^3$, which are connected together along shared edges and vertices, are also described in an article by H. Hoppe, T. DeRose, T. Duchamp, J. McDonald and W. Stützle, entitled "Mesh Optimization", Computer Graphics, Proc. SIGGRAPH, pp. 19–26 (1993).

Because the removal of a whisker is equivalent to contracting all lateral edges of the corresponding dual track, the error associated with the removal of a whisker can be obtained by determining errors associated with contracting lateral edges of a dual track. If ab is a lateral edge, the error introduced by contracting ab to a new vertex c is measured by adding the square distances of c from a collection of planes associated with a and with b. The initial planes associated with a vertex are the ones spanned by the vertex and two contiguous neighbors in a circular order around the vertex. As described in the aforementioned article to M. Garland et al., the collection of planes are not explicitly stored but rather implicitly represented by the fundamental quadrics, which are 4-by-4 matrices from which the sums of square distances can be computed. The error of the contraction of ab, denoted as E(ab), is defined as the minimum error achievable by varying c. If L represents a set of lateral edges of a corresponding track, then the mean, variance and mean square of the error over all edges are:

$$\text{mean} = \Sigma_{ab \in L}(E(ab))/\text{card } L \quad (1)$$

$$\text{variance} = \Sigma_{ab \in L}(E(ab)-\text{mean})^2/\text{card } L \quad (2)$$

$$\text{mean square} = \Sigma_{ab \in L}(ab)^2/\text{card } L \quad (3)$$

where the mean square is equivalent to a sum of the variance and a square of the mean. The prioritization of the tracks for removal preferably uses the mean square of the error, because this value typically gives better results than both the mean error and the maximum error defined as $\max\{E(ab) | ab \in L\}$. The mean square can be determined by accumulating $\Sigma E(ab)^2$ in a single loop over the lateral edges of the track.

Figure 5:
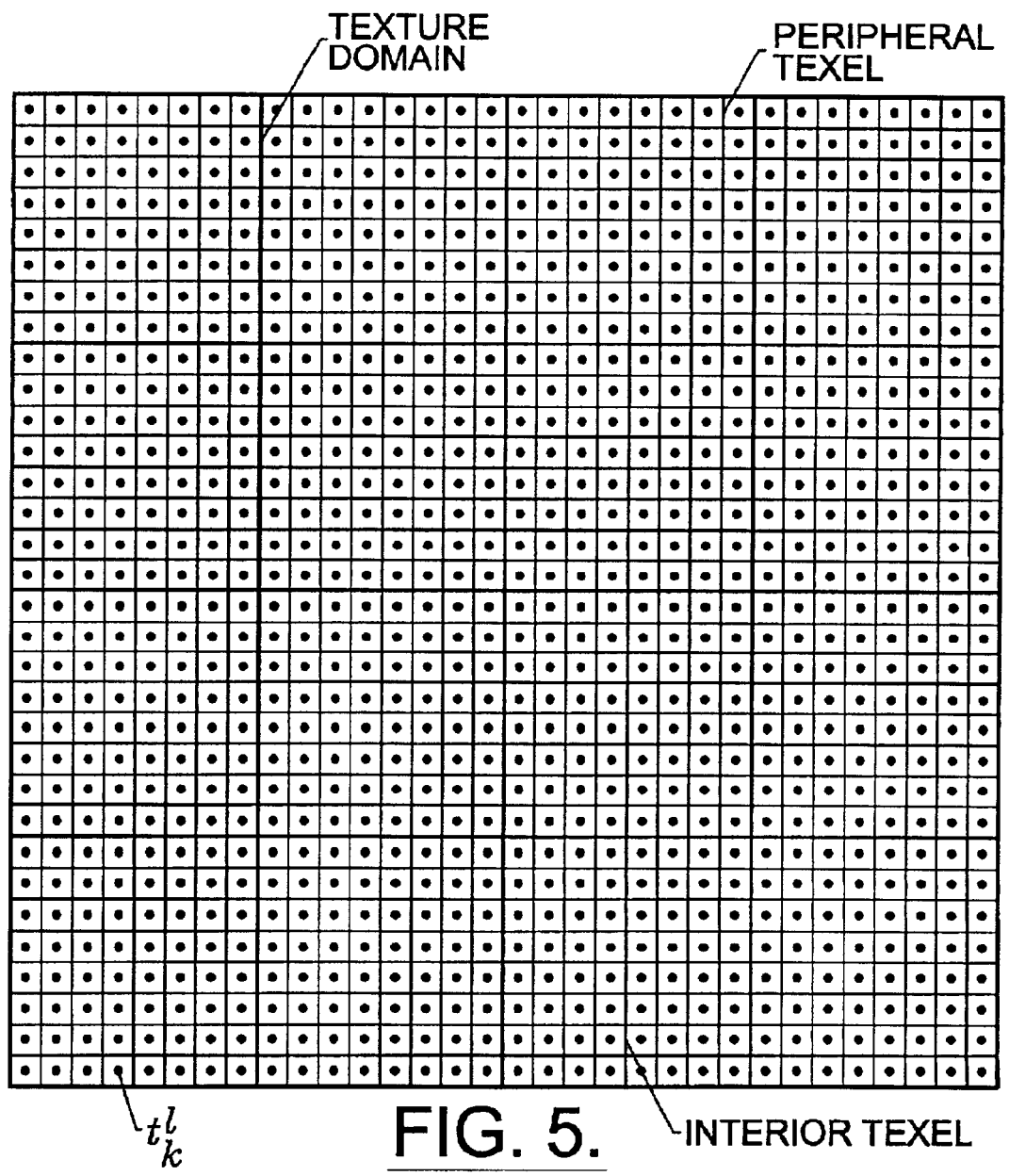
FIG. 5 illustrates a texture map containing 16 texture domains of 64 texels/domain.
Figure 6A:
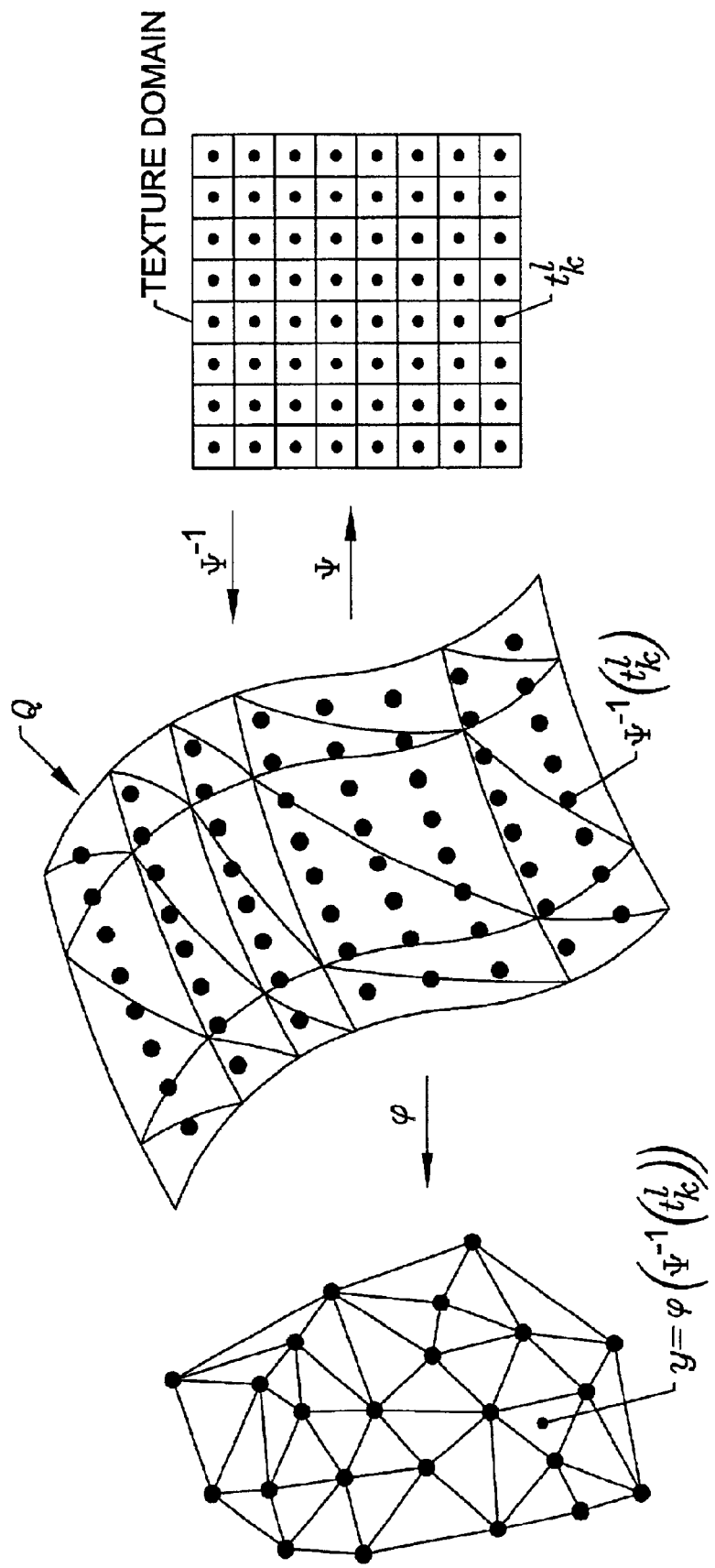
FIG. 6A illustrates the mapping of a texture domain in a texture map to a corresponding patch Q and further to the fine triangulation.

A parametrization $\psi: Q \to [0,1]^2$ of the quadrangular patches in the quadrangulation generated at Block 140 of FIG. 2 is preferably used to construct the texture maps described with respect to Block 180. Each texture map can be viewed as associating a regular grid of points in $[0,1]^2$ with information that is then transported to Q via the inverse map $\psi^{-1}$. A two-dimensional texture array is a square grid of $2^n$ times $2^n$ smaller squares referred to as texels. A texel is the smallest addressable unit in the texture array. The texture array is also preferably decomposed into smaller arrays of $2^m$ times $2^m$ texels, for m<n, referred to as texture domains. Each such texture domain is associated with a respective quadrangular patch on the quadrangulation. As illustrated by FIG. 5, up to $(2^{n-m})^2$ texture domains can be embedded in the texture array. In particular, FIG. 5 illustrates 16 texture domains of 64 texels/domain. This combination yields a texel array having 1024 texels. Texels are preferably addressed by their row and column within a respective texture domain, rather than in the larger embedded texture array. Given the parametrization $\psi: Q \to [0,1]^2$, a center of a texel is preferably mapped to a corresponding patch Q using $\psi^{-1}$. Points besides or in addition to the center can also be used in the mapping. In particular, each texel in row k and column I can be identified by the point:

$$t'_k = ((k+\tfrac{1}{2})/2^m, (I+\tfrac{1}{2})/2^m) \in [0,1]^2 \quad (4)$$

where $0 \leq k, I \leq 2^m - 1$. The corresponding point of Q is $\psi^{-1}(t'_k)$, as illustrated by FIG. 6A, where each texel center is mapped to its preimage on a respective patch Q.

Each vertex of a triangle within a patch Q has a u,v texture coordinate assigned to it that indexes into the texture map. The u,v texture coordinate range in the quadrangulation is from 0.0 to 1.0. The coordinate 0.0, 0.0 is the lower left-hand corner of the texture map with 1.0, 1.0 being the upper right-hand corner. Since each triangle in the coarse triangulation is generated from a grid line track intersection, and the grid lines represent the u,v patch parametrization (which also goes from 0.0, 0.0 to 1.0, 1.0), the triangle vertices have definable u,v coordinates with the respective patch.

The parametrization $\psi: Q \rightarrow [0,1]^2$ can be constructed using the representation of each quadrangular patch Q as a grid of I·J quadrangular faces arranged in I rows and J columns. There are I+1 rows and J+1 columns of vertices, and for each $0 \leq i \leq I$ and $0 \leq j \leq J$, $R_i$ and $C^j$ are defined to be the paths of edges connecting the vertices of row i and the vertices of column j. The vertex at the intersection of the two paths is $q^j_i = R_i \cap C^j$. The coordinates of $q^j_i$ are by definition the fractions of the initial paths, $$u(q^j_i) = |R^{0j}_i|/|R_i| \qquad (5)$$

$$v(q^j_i) = |C^j_{0i}|/|C^j| \qquad (6)$$

where $|R^{0j}_i|$ is the length of the path between $q^0_i$ and $q^j_i$, $|R_i|=|R_{0,I i}|$, $|C^j_{0i}|$ is the length of the path between $q^j_0$ and $q^j_i$, and $|C^j|=|C^j_{0i}|$. Since each face of the grid is preferably decomposed into two triangles, as illustrated by FIG. 6A, the definition of coordinates can be extended to all points of Q using linear interpolation. Accordingly, the definition $\psi(x) = (u(x), v(x))$ applies for all points $x \in Q$.

The grid representing a patch Q is constructed using relaxation methods that enable a layout with gradual variation of length and angle. This gradual variation of length and angle is one reason why the map $\psi$ is, in most cases, a homeomorphism and can therefore be used as a parametrization. It is possible, however, that $\psi$ is not a homeomorphism. This happens if and only if the vertices of a positively oriented triangle pqr in the representation of Q map to points $\psi(p), \psi(q), \psi(r)$ with negative orientation in $[0,1]^2$. When this happens, the preimage of every point $x \in [0,1]^2$ still exists but may be ambiguous. This is because $\psi$ is at least surjective, as noted by the fact that $\psi$ is continuous by construction and that it maps the boundary of Q surjectively onto the boundary of $[0,1]^2$.

Operations to determine the preimage $x = \psi^{-1}(t^t_k)$ of each texel center include a local search starting in the triangle that contains $\psi^{-1}(t^{t-1}_k)$, and if I=0, then the triangle that contains $\psi^{-1}(t^t_{k-1})$ is the start point of the local search operation. However, if k=I=0, then the starting point may be the upper left corner triangle of Q. Often, x will lie in the same triangle, in which case its barycentric coordinates can be computed by solving a 3-by-3 linear system of equations. Otherwise, an operation is performed to step from triangle to triangle until a triangle containing x is found. Assuming $\psi$ is a homeomorphism, this triangle pqr containing x is unique and characterized by the fact that $t^t_k = \psi(x)$ lies on the positive sides of the directed lines passing through $\psi(p), \psi(q)$, through $\psi(q), \psi(r)$, and through $\psi(r), \psi(p)$, in this order. Any other triangle has an edge pq such that $\psi(x)$ is on the negative side of the directed line passing through $\psi(p), \psi(q)$. The search can thus continue in the triangle on the other side of pq.

Figure 7:
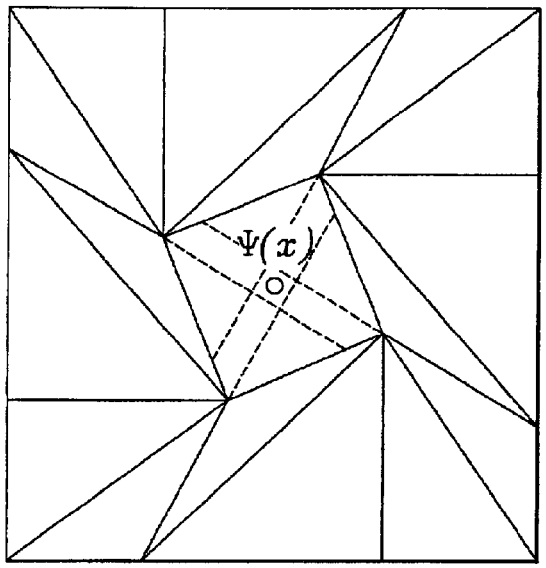
FIG. 7 illustrates a local searching operation (without marking) being performed in a counter-clockwise cycle.

However, even if $\psi$ is homeomorphic, it is possible that these search operations may run in circles, as shown in FIG. 7. In particular, FIG. 7 shows sixteen shaded triangles that form a counter-clockwise cycle and may be followed by the local search operations, if the search operations are performed without marking. Additional complications may be caused by the possibility of a non-homeomorphic map $\psi$. To avoid infinite loops, it is preferable that triangles be marked when they are visited and that marked triangles not be visited twice during the same search. The resulting strategy is a depth-first search that typically hones in on the correct triangle rather quickly. In a worst case scenario, this strategy exhausts all triangles in the representation of Q and is therefore guaranteed to find a triangle that contains a pre-image of $t^t_k$.

Figure 8:
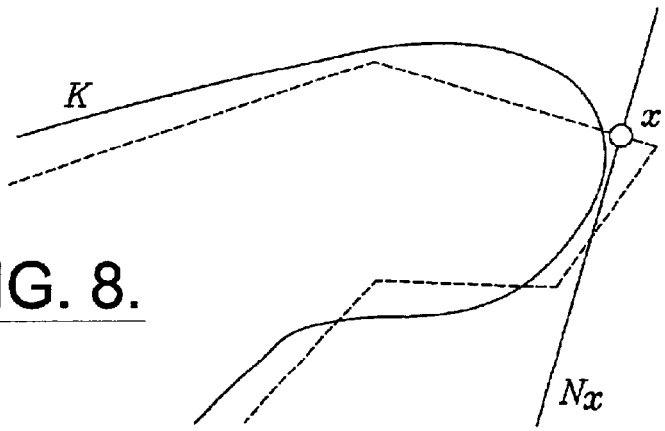
FIG. 8 illustrates a miss between a normal line at x and the fine triangulation K.

It is preferred that the information stored in the texture maps (color, displacement and perturbed normal) be obtained from the most accurate source available, which is the original (colored) fine triangulation K of a surface of a colored object. As illustrated by Block 120 of FIG. 2, this triangulation is preferably generated by wrapping colored data points. This information is accessed by mapping each spatial point $x = \psi^{-1}(t^t_k)$ on each patch Q to a corresponding object point $y = \phi(x)$ on K. For a point $x \in Q$, $N_x$ can be treated as the line normal to Q that passes through x. The object point $y = \phi(x)$ is defined as the point where $N_x$ intersects K. The mapping operation $\phi$ is referred to as the normal projection of the coarse triangulation, Block 160, onto the fine triangulation, Block 120. Since both the coarse and fine triangulations approximate the same surface, x is generally well-defined, but in exceptional cases it may happen that $N_x$ intersects K in more than one point or not at all. If the former case, $\phi(x)$ can be defined as the point $y \in N_x \cap K$ closest to x. An example of the latter case is shown in FIG. 8, where the normal line at x is illustrated as missing the triangulation K represented by the solid curve. In this latter case, $\phi(x)$ can be defined as the object point y on K that minimizes the distance to x. Since the exceptional cases are typically rare, the influences on the texture maps is typically unnoticeable.

Figure 9:
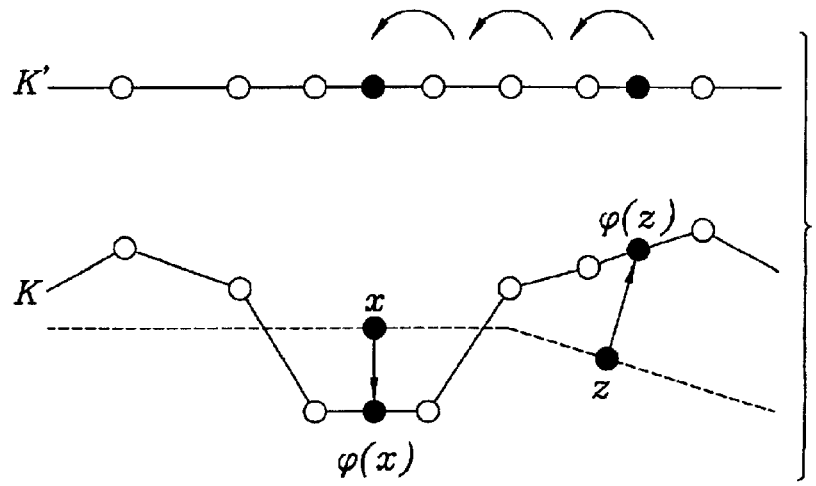
FIG. 9 illustrates performance of a local search operation in the projection K' of the fine triangulation K.

The operations for determining $\phi$ are similar to the operations for determining $\psi^{-1}$. Let x be a spatial point on a patch Q and assume that a search for a nearby point $z \in Q$ has just been performed. The triangle $abc \in K$ is used that contains $\phi(z)$ as the starting point for the search. Let K' be the projection of K along the direction of $N_x$, as illustrated in one dimension in FIG. 9. Finding $\phi(x)$ by searching locally from triangle to triangle starting at $\phi(z)$ is generally fast and straightforward but may be complicated because (i) there may be configurations of triangles in K' that are as shown in FIG. 7, (ii) the triangulation K may fold over itself in the projection along $N_x$, or (iii) the line $N_x$ may intersect K in more than one point or it may miss K. A marking operation, as described above with respect to the operations for determining $\psi^{-1}$, is sufficient to deal with complications (i) and (ii). If $N_x$ intersects K in more than one point, then the search operations will find one of these multiple points but not the one necessarily closest to x. However, since the search proceeds locally, the search will typically find a point sufficiently close to x. Finally, in the case where $\phi(x)$ is unacceptably far from x or $\phi(x)$ cannot be found, the following relationship will be satisfied: $N_x \cap K = 0$. In this case, operations will be performed that find $y = \phi(x)$ by exhaustively searching K. These operations are permitted to be relatively slow since they are infrequently performed.

Texture maps are preferably constructed using the maps $\psi$ and $\phi$. In the cases of constructing a color map, a displacement map and a perturbed normal map, the texture information of a texel with center t is computed from the corresponding point y on K, where:

$$y = \phi(\psi^{-1}(t)) \qquad (7)$$

The color map stores color information. The standard representation of color typically uses 24 bits, 8 bits each to specify one of $2^8=256$ possible red, green and blue values. Because each vertex $a \in K$ has a color value $\chi(a)$ by construction, the color of the object point $y \in K$ can be determined by linear interpolation as:

$$\chi(y)=\alpha\chi(a)+\beta\chi(b)+\gamma\chi(c) \qquad (8)$$

where abc is a triangle on the fine triangulation K that contains the first object point y and $\alpha$, $\beta$, $\gamma$ are the barycentric coordinates of y defined such that $\alpha+\beta+\gamma=1$ and $\alpha a+\beta b+\gamma c = y$. Since $\alpha, \beta, \gamma \geq 0$, a valid color $\chi(y)$ is rounded to the nearest integer and stored in the texel with center t. Other operations that can determine the color of the object point from the color of the vertices of the triangle abc may also be used.

Figure 6B:
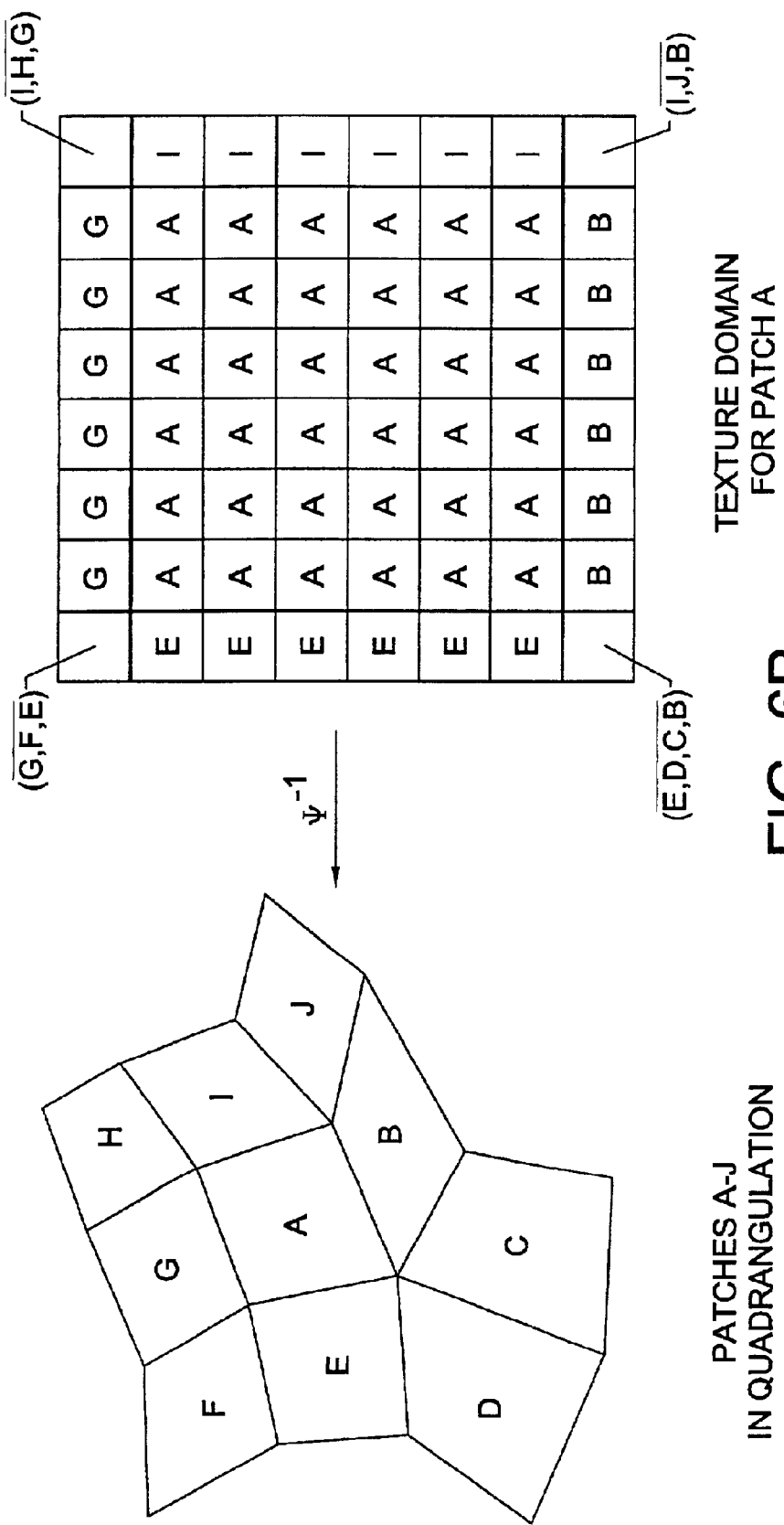
FIG. 6B illustrates the preferred mapping of texture domain A in a texture domain to a corresponding patch A in a quadrangulation that is surrounded by adjacent patches B–J, in the case where texture domains B–J, which map to patches B–J, are not immediately adjacent to the texture domain A in the texture map.

In cases where the fine triangulation K is significantly finer than the texel array, the quality of the color map can be improved by performing an operation to oversample and average color. In particular, rather than using only the texel center, the center point and four corner points of the texel are mapped to K. The color value to be stored in the texel can then be obtained by determining and averaging the color of the five corresponding object points on K. The operations for determining the color map may also account for rendering artifacts that can be observed when several texels are mapped to the same pixel of an image device displaying the color object, Block 190. The display mechanism automatically averages the color values of all texels in an appropriate neighborhood of the center texel, which leads to artifacts when texture domains that are not adjacent in the texel array map to adjacent patches of the model surface. To eliminate or at least reduce these display artifacts, the first and last rows and columns of every texture domain (i.e., peripheral texels) can be used to duplicate color information from texture domains that correspond to other patches, as illustrated by FIG. 6B. These other patches extend adjacent a patch to which interior texels within a corresponding texture domain are mapped. This partial duplication insures that color averaging operations performed by the display device are performed over an appropriate collection of color values. FIG. 6B also illustrates how peripheral texels, such as corner texels, may receive color information based on an average of a plurality of adjacent patches.

The displacement map stores local offset information. The standard representation uses 24 bits but typically repeats the same 8 bits three times, so only 256 different values can be encoded. Each value approximates a multiple of the unit outward normal. To construct the displacement map, $n_x$ is defined as the unit outward normal at the spatial point $x=\psi^{-1}(t)$. The object point is determined by $y=\phi(x)$ and the displacement $\delta(y)$ is defined as the signed height difference between the spatial point x and the object point y and is determined by solving:

$$y=x+\delta(y)\cdot n_x \qquad (9)$$

Using these relationships, the displacement values for all texel centers (or other corners, etc.) can be determined. An affine transformation can also be constructed that maps a minimum displacement value to the value 0 and a maximum displacement value to the value 255. The displacement $\delta(y)$ is first transformed and then rounded down to the nearest integer in [0,255], with the maximum also rounded down to 255. The integer value is the value stored in the texel with center t.

Figure 10:
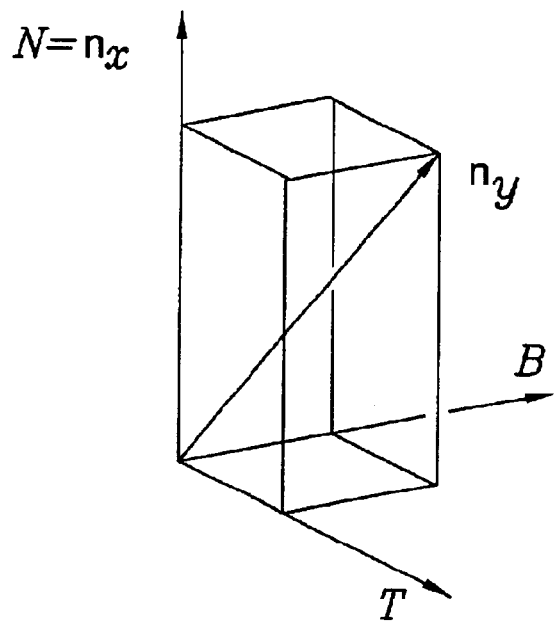
FIG. 10 illustrates orientation of a unit normal $n_y$ within an orthonormal frame (N, T, B) defined for $n_x = N$.

The normal map stores the difference between the outward unit normals at the spatial points $x=\psi^{-1}(t)$ and their normal projections $y=\phi(x)$. The difference may also be expressed in three times 8 bits. In order to determine the difference between the outward normals and their normal projections, an orthonormal frame is preferably constructed that includes the normal vector $n_x$. In this orthonormal frame (N,T,B) defined for $n_x=N$, the unit normal vector $n_y$ is expressed as well, as illustrated by FIG. 10. It is preferable that the tangent direction T and binormal direction B be chosen to extend at least roughly along the u-coordinate and v-coordinate lines passing through $x \in Q$. More precisely, the following deterministic operations are preferably performed to obtain a predictable orthonormal frame where:

$N=n_x$ $d$=v-direction at x $T=N \times d$ $T=T/\|T\|$ $B=T \times N$

By construction, N, T and B are all unit length. A triplet $(\lambda,\mu,u) \in [-1, +1]^3$ may also be determined, where:

$$n_y=\lambda \cdot N+\mu \cdot T+u \cdot B \qquad (10)$$

and $n_y$ is a unit normal vector at the first object point y as expressed in the orthonormal frame. As described above with respect to the operations for constructing the displacement map, an affine transformation and rounding can be used to map $\lambda$, $\mu$, and u to three 8-bit integers. This triplet is the value stored in the texel with center t. Rendering systems can make use of this normal offset information to make more accurate and realistic lighting calculations. The perturbed normal map can make low triangle count models (e.g., coarse triangulation) have the accurate lighting effects usually seen on much higher density models.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of modeling a three-dimensional object, comprising:

generating a model of a three-dimensional surface of the object from a second plurality of points that define a coarse digital representation of the three-dimensional surface and a texture map containing information derived by mapping points within the texture map to a fine digital representation of the three-dimensional surface that is defined by a first plurality of three-dimensional colored points, by:

generating a quadrangulation of the three-dimensional surface from the first plurality of three-dimensional colored points;

converting the quadrangulation into the second plurality of points; and determining the texture map for the coarse digital representation of the three-dimensional surface by determining for a first texel in the texture map a respective texel coordinate that identifies a first spatial point on the coarse digital representation of the three-dimensional surface and projecting the first spatial point to a first object point on the fine digital representation of the three-dimensional surface.

2. The method of claim 1, wherein said step of determining a texture map comprises the step determining a color map by assigning a color associated with the first object point to the first texel.

3. The method of claim 2, wherein the second plurality of points constitute vertices of a coarse triangulation; wherein the first plurality of three-dimensional colored points constitute vertices of a fine triangulation; and wherein the color associated with the first object point y is determined by a function x(y), where:

$$\chi(y)=\alpha\chi(a)+\beta\chi(b)+\gamma X(c),$$

abc is a triangle on the fine triangulation that contains y and $\alpha, \beta, \gamma$ are the barycentric coordinates of y defined such that $\alpha+\beta+\gamma=1$ and $\alpha a+\beta b+\gamma c=y$.

4. The method of claim 3, wherein patch boundaries of the quadrangulation Q trace u-coordinate and v-coordinate lines; and wherein said step of determining a texture map comprises the steps of:

determining a displacement map by assigning a height difference $\delta(y)$ between the first spatial point x and the first object point y to the first texel, where $$y=x+\delta(y)\cdot n_x$$

and $n_x$ is a vector that extends in a direction from the first spatial point to the first object point and is normal to the coarse digital representation of the three-dimensional surface at the first spatial point;

determining a perturbed normal map by:
constructing an orthonormal frame (N, T, B) defined for $N=n_x$,
where T and B are the tangent and binormal directions at the first spatial point, respectively; and
determining a triplet $(\lambda,\mu,u)\epsilon[-1,+1]^3$ where:

$$n_y=\lambda\cdot N+\mu\cdot T+u\cdot B$$

and $n_y$ is a normal vector at the first object point as expressed in the orthonormal frame.

5. The method of claim 1, wherein said converting step comprises the steps of:
decomposing the quadrangulation into a quadrangular grid; and
decimating the quadrangular grid through a sequence of track contractions that are prioritized by an error function.

6. The method of claim 1, wherein said converting step comprises:
decomposing the quadrangulation into a quadrangular grid;
creating a dual graph of the quadrangular grid; and
removing whiskers from the dual graph using a simplification operation that is driven by a priority queue that orders whiskers by a respective error their removal causes to the quadrangular grid.

7. The method of claim 6, wherein the respective error is a mean. square error.

8. The method of claim 1, wherein said converting step comprises the steps of:
decomposing the quadrangulation into a quadrangular grid; and
generating an intermediate triangulation from the quadrangular grid using a decomposition operation that preserves vertices of the quadrangular grid and patch boundaries from the quadrangulation.

9. The method of claim 8, further comprising the step of decimating the intermediate triangulation into a coarse triangulation using a sequence of edge contractions that preserve patch boundaries from the quadrangulation.

10. A method of modeling a three-dimensional object, comprising:
generating a model of a three-dimensional surface of the object from a second plurality of points that define a coarse digital representation of the three-dimensional surface and a texture map containing information derived by mapping points within the texture map to a fine digital representation of the three-dimensional surface that is defined by a first plurality of three-dimensional colored points, by:
determining the texture map for the coarse digital representation of the three-dimensional surface by determining for a first texel in the texture map a respective texel coordinate that identifies a first spatial point on the coarse digital representation of the three-dimensional surface and projecting the first spatial point to a first object point on the fine digital representation of the three-dimensional surface.

11. The method of claim 10, wherein said step of determining a texture map comprises determining a color map by assigning a color associated with the first object point to the first texel.

12. The method of claim 10, wherein said step of determining a texture map comprises determining a displacement map by assigning a height difference between the first spatial point and the first object point to the first texel.

13. The method of claim 10, wherein said step of determining a texture map comprises determining a displacement map by assigning a height difference $\delta(y)$ between the first spatial point x and the first object point y to the first texel, where $$y=x+\delta(y)\cdot n_x$$

and $n_x$ is a vector that extends in a direction from the first spatial point to the first object point and is normal to the coarse digital representation at the first spatial point.

14. The method of claim 10, wherein said step of determining a texture map comprises the step of determining a perturbed normal map by assigning a difference between a first normal at the first spatial point and a second normal at the first object point to the first texel.

15. The method of claim 14, wherein said step of determining a texture map comprises the step of determining a perturbed normal map by constructing an orthonormal frame (N, T, B) defined for $N=n_x$, where T and B are the tangent and binormal directions at the first spatial point, respectively.

16. The method of claim 15, wherein said step of determining a perturbed normal map comprises determining a triplet $(\lambda, \mu,u)\epsilon[-1, +1]^3$ where:

$$n_y=\lambda\cdot N+\mu\cdot T+u\cdot B$$

and $n_y$ is a normal vector at the first object point as expressed in the orthonormal frame.

17. The method of claim 4, where $T=N\times d/\|N\times d\|$ and $B=T\times N$ and d is a direction of a v-coordinate line passing through the first spatial point $x\epsilon Q$.

18. A method of modeling a three-dimensional object, comprising the step of:
generating a model of a three-dimensional surface of the object from a second plurality of points that define a coarse digital representation of the three-dimensional surface and a texture man containing information derived by mapping points within the texture man to a fine digital representation of the three-dimensional surface that is defined by a first plurality of three-dimensional colored points, said generating step comprising:
    generating a guadrangulation of the three-dimensional surface from the first plurality of three-dimensional colored points;
    converting the guadrangulation into the second plurality of points; and
    constructing the texture man for the coarse digital representation of the three-dimensional surface using a parametrization $\psi$ of the quadrangular patches on the guadrangulation, said constructing step comprising:
        determining for a first texel in the texture map a respective texel coordinate that, using $\psi^{-1}$, identifies a first spatial point on the coarse digital representation of the three-dimensional surface; and
        projecting along a normal from the first spatial point to a first object point on the fine digital representation of the three-dimensional surface.

19. A method of modeling a three-dimensional object, comprising the step of:
    generating a model of a three-dimensional surface of the object from a second plurality of points that define a coarse digital representation of the three-dimensional surface and a texture mar containing information derived by mapping points within the texture map to a fine digital representation of the three-dimensional surface that is defined by a first plurality of three-dimensional colored points, said generating step comprising:
        generating a subdivision surface model from the first plurality of three-dimensional colored points;
        converting the subdivision surface model into the second plurality of points; and
        determining the texture map for the coarse digital representation of the three-dimensional surface by:
            determining for a first texel in the texture map a respective texel coordinate that identifies a first spatial point on the coarse digital representation of the three-dimensional surface; and
            projecting the first spatial point to a first object point on the fine digital representation of the three-dimensional surface.

20. A method of modeling a three-dimensional colored object, comprising:
    generating a colored model of a surface of the colored object from a coarse triangulation of the surface and a texture map containing information obtained by mapping points within the texture map to a fine triangulation of the surface that has colored vertices derived from three-dimensional colored scan data, said generating step comprising generating the texture map as a color map containing an array of texels; and wherein a first texel in the array of texels retains color information derived from mapping a center and at least a first corner of the first texel to respective spatial points on the coarse triangulation.

21. The method of claim 20, wherein the first texel retains color information derived from mapping a center and each corner of the first texel to respective spatial points on the coarse triangulation.

22. The method of claim 21, wherein the color information is derived from mapping the respective spatial points on the coarse triangulation along normal projections to respective object points on the fine triangulation.

23. A method of modeling a three-dimensional colored object, comprising the step of:
    generating a colored model of a surface of the colored object from a coarse triangulation of the surface and a texture man containing information obtained by manning points within the texture map to a fine triangulation of the surface that has colored vertices derived from three-dimensional colored scan data, said generating step comprising generating the texture map as a color map containing an array of texels having a plurality of texture domains therein; wherein a first texture domain in the plurality of texture domains comprises I columns and k rows of texels; wherein a first texel in the Ith column of the first texture domain retains color information derived from mapping at least one of a center or corner of the first texel to a first patch on the coarse triangulation; and wherein a second texel in the first texture domain retains color information derived from mapping at least one of a center or corner of the second texel to a second patch on the coarse triangulation that is contiguous with the first patch at a patch boundary.

24. A method of modeling a three-dimensional colored object, comprising the steps of:
    generating a coarse triangulation model from a fine triangulation model of a colored object that has colored vertices corresponding to physical locations on the colored object that have been digitally scanned; and
    generating a texture map having an array of texture domains therein that retain color information derived by mapping each texture domain to respective quadrangular patches on the coarse triangulation model and mapping spatial points on the quadrangular patches to object points on the fine triangulation model;
    wherein said step of generating a texture map comprises generating the texture map as a color map containing an array of texels having a plurality of texture domains therein; wherein a first texture domain in the plurality of texture domains comprises I columns and k rows of texels; wherein a first texel in the Ith column of the first texture domain retains color information derived from mapping at least one of a center or corner of the first texel to a first quadrangular patch on the coarse triangulation model; and wherein a second texel in the first texture domain retains color information derived from mapping at least one of a center or corner of the second texel to a second quadrangular patch on the coarse triangulation model that is contiguous with the first quadrangular patch at a patch boundary.

25. A method of modeling a three-dimensional colored object, comprising the steps of:
    capturing colored shape detail as three-dimensional point data from a physical object, with each datum comprising three real numbers providing geometric information and three integer numbers providing color information; and
    converting the captured color shape detail into a coarse digital model of the physical object and a model enhancing texture map that maps points therein to the coarse digital model and retains color information derived from mapping points within the coarse digital model to a finer digital model derived from the captured colored shape detail, said converting step comprising:
        generating a fine triangulation model of the physical object by wrapping the three-dimensional point data;

generating a fine quadrangular grid model of the physical object by shaping the wrapped point data; and simplifying the fine quadrangular grid model into a coarse quadrangular grid model by removing tracks from the fine quadrangular grid model that contribute relatively little to the shape of the fine quadrangular grid model when compared to other tracks within the fine quadrangular grid model.

26. The method of claim 25, wherein said converting step comprises:

generating a first map that maps each quadrangular patch on the coarse quadrangular grid model to a respective texture domain in the texture map; and generating a second map that maps spatial points on the coarse quadrangular grid model to object points on the fine triangulation model.

27. The method of claim 26, wherein the texture map is created so that each texture domain has at least two texels therein that map to different patches on the coarse quadrangular grid model.

28. A method of modeling a colored object, comprising the steps of:

automatically generating a triangulation model of the colored object that is defined by a plurality of quadrangular patches that extend within respective continuous grid tracks that loop around the triangulation model, from three-dimensional colored scan data that identify location and color of points on the colored object; and generating a texture map that contains information derived from mapping spatial points on the triangulation model to object points on another model derived from the colored scan data;

wherein the texture map comprises a plurality of texture domains; and wherein a first texture domain in the plurality of texture domains includes interior texels that map to a first quadrangular patch in the triangulation model and peripheral texels that map to at least a second quadrangular patch in the triangulation model.

29. The method of claim 28, wherein the second quadrangular patch shares a patch boundary with the first quadrangular patch.

30. A method of modeling a three-dimensional object, comprising the step of:

generating a texture map having at least a first texture domain therein that comprises at least a first peripheral texel retaining color information derived from mapping the first peripheral texel to a first patch on a quadrangulation model of the three-dimensional object and at least a first interior texel retaining color information derived from mapping the first interior texel to a second patch on the quadrangulation model.

31. The method of claim 30, wherein the first and second patches share a common patch boundary.

32. A method of modeling a three-dimensional object, comprising the step of:

decimating a fine quadrangular grid model of the three-dimensional object into a coarse quadrangular grid model of the three-dimensional object by removing tracks from the fine quadrangular grid model that contribute relatively little to the shape of the fine quadrangular grid model when compared to other tracks within the fine quadrangular grid model.

33. The method of claim 32, wherein said decimating step is performed using a sequence of edge contractions that are prioritized by an error function.

34. The method of claim 32, wherein said decimating step comprises the steps of:

creating a dual graph of the fine quadrangular grid model; and removing whiskers from the dual graph using a simplification operation that is driven by a priority queue that order whiskers by a respective error their removal causes to the quadrangular grid.

35. A computer program product that models three-dimensional objects and comprises a computer-readable storage medium having computer-readable program code embodied in said medium, said computer-readable program code comprising:

computer-readable program code that generates a coarse triangulation model from a fine triangulation model of a colored object that has colored vertices corresponding to physical locations on the colored object that have been digitally scanned; and computer-readable program code that generates a texture map having an array of texture domains therein that retain color information derived by mapping texels within the texture domains to spatial points on quadrangular patches on the coarse triangulation model and to object points on the fine triangulation model;

wherein said computer-readable program code that generates a texture map comprises computer-readable program code that generates a texture map as a color map containing an array of texels having a plurality of texture domains therein; wherein a first texture domain in the plurality of texture domains comprises I columns and k rows of texels; wherein a first texel in the Ith column of the first texture domain retains color information derived from mapping at least one of a center or corner of the first texel to a first quadrangular patch on the coarse triangulation model; and wherein a second texel in the first texture domain retains color information derived from mapping at least one of a center or corner of the second texel to a second quadrangular patch on the coarse triangulation model that is contiguous with the first quadrangular patch at a patch boundary.

36. A computer program product that models three-dimensional colored objects and comprises a computer-readable storage medium having computer-readable program code embodied in said medium, said computer-readable program code comprising:

computer-readable program code that decimates a fine quadrangular grid model of the three-dimensional object into a coarse quadrangular grid model of the three-dimensional object by removing tracks from the fine quadrangular grid model that contribute relatively little to the shape of the fine quadrangular grid model when compared to other tracks within the fine quadrangular grid model.

37. The computer program product of claim 36, wherein said computer-readable program code that decimates a fine quadrangular grid model of the three-dimensional object into a coarse quadrangular grid model of the three-dimensional object, comprises:

computer-readable program code that creates a dual graph of the fine quadrangular grid model; and computer-readable program code that removes whiskers from the dual graph using a simplification operation that is driven by a priority queue that order whiskers by a respective error their removal causes to the quadrangular grid.

* * * * *

UNITED STATES PATENT AND TRADEMARK OFFICE
CERTIFICATE OF CORRECTION

PATENT NO. : 6,853,373 B2
DATED : February 8, 2005
INVENTOR(S) : Williams et al.

It is certified that error appears in the above-identified patent and that said Letters Patent is hereby corrected as shown below:

Column 17,
Line 13, change "guadrangulation" to -- quadrangulation --.
Line 27, change "man" to -- map --.

Column 18,
Line 5, change "man" to -- map --.
Lines 5-6, change "manning" to -- mapping --.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,853,373 B2
DATED : February 8, 2005
INVENTOR(S) : Williams et al.

It is certified that error appears in the above-identified patent and that said Letters Patent is hereby corrected as shown below:

<u>Column 16,</u>
Lines 66 and 67, change "man" to -- map --.

<u>Column 17,</u>
Line 10, change "man" to -- map --.

Signed and Sealed this

Twenty-seventh Day of September, 2005

JON W. DUDAS
*Director of the United States Patent and Trademark Office*